United States Patent
Gupta et al.

(10) Patent No.: US 8,848,890 B2
(45) Date of Patent: Sep. 30, 2014

(54) SYSTEM AND METHOD FOR ROUTING CALLS TO MULTIPLE COMMUNICATION DEVICES ASSOCIATED WITH ONE PHONE NUMBER

(75) Inventors: Shekhar Gupta, Overland Park, KS (US); Mike A. Roberts, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1212 days.

(21) Appl. No.: 12/191,135

(22) Filed: Aug. 13, 2008

(65) Prior Publication Data

US 2010/0040215 A1 Feb. 18, 2010

(51) Int. Cl.
*H04M 1/56* (2006.01)
*H04M 3/42* (2006.01)

(52) U.S. Cl.
CPC .................................. *H04M 3/42238* (2013.01)
USPC .................................. 379/142.06; 379/207.15

(58) Field of Classification Search
USPC ............ 379/207.13–207.14, 211.01–211.04, 379/212.01, 213.01, 214.01, 265.13, 379/142.06, 142.07; 455/461
See application file for complete search history.

(56) References Cited

U.S. PATENT DOCUMENTS

| 6,393,275 | B1 * | 5/2002 | Alfred | 455/422.1 |
|---|---|---|---|---|
| 2002/0122545 | A1 * | 9/2002 | Schwab et al. | 379/211.02 |
| 2003/0068019 | A1 * | 4/2003 | Colemon | 379/88.19 |
| 2004/0028208 | A1 * | 2/2004 | Carnazza et al. | 379/221.01 |
| 2004/0234061 | A1 * | 11/2004 | Koch et al. | 379/207.02 |
| 2004/0258220 | A1 * | 12/2004 | Levine et al. | 379/88.23 |
| 2005/0148353 | A1 * | 7/2005 | Hicks et al. | 455/466 |
| 2006/0062358 | A1 * | 3/2006 | Pearson et al. | 379/88.2 |
| 2006/0251229 | A1 * | 11/2006 | Gorti et al. | 379/142.02 |
| 2008/0089497 | A1 * | 4/2008 | Walter et al. | 379/102.02 |
| 2008/0144798 | A1 * | 6/2008 | Sidhom et al. | 379/211.02 |
| 2009/0086947 | A1 * | 4/2009 | Vendrow | 379/201.12 |
| 2012/0008756 | A1 * | 1/2012 | Arsenault et al. | 379/142.17 |

FOREIGN PATENT DOCUMENTS

WO   WO 2009082805 A1 *   7/2009

* cited by examiner

*Primary Examiner* — Fan Tsang
*Assistant Examiner* — Jeffrey Lytle
(74) *Attorney, Agent, or Firm* — Swanson & Bratschun, L.L.C.

(57) ABSTRACT

An embodiment of a method for routing an incoming call includes receiving an incoming call addressed to a single phone number associated with a plurality of users at a network routing device. The method further includes determining, by the network routing device, an incoming caller identifier associated with the incoming call and determining, by the network routing device whether the incoming caller identifier matches at least one caller identifier in a caller list associated with at least one particular user of the plurality of users. If the caller identifier matches a caller identifier in a caller list associated with the particular user, the incoming call is routed, by the network routing device, to at least one telephone associated with the particular user.

12 Claims, 5 Drawing Sheets

150

ADDRESS BOOK
phone number 913-555-1234 user #1: John Smith (father)

| caller list | device list | |
|---|---|---|
| caller identifier | device name | unique hardware identifier |
| 214-556-7654 | work phone | 01:23:45:67:89:ab |
| 214-555-1289 | home phone | 01:45:67:98:12:23 |
| 913-555-0000 | cell phone | 55:12:23:55:66:77 |
| 913-556-1122 | | | user #2: Susan Smith (mother)

| caller list | device list | |
|---|---|---|
| caller identifier | device name | unique hardware identifier |
| 913-555-8888 | work phone | 02:34:56:78:91:cd |
| 913-556-1234 | home phone | 01:45:67:98:12:23 |
| 214-555-1289 | cell phone | 08:55:44:66:22:ff |
| 913-555-9898 | | | user #3: Jane Smith (daughter)

| caller list | device list | |
|---|---|---|
| caller identifier | device name | |
| 913-555-2223 | cell phone | 05:12:88:23:55:01 |
| 913-555-1155 | home phone | 01:45:67:98:12:23 |
| 913-555-1122 | | |

*FIG. 2*

SYSTEM AND METHOD FOR ROUTING CALLS TO MULTIPLE COMMUNICATION DEVICES ASSOCIATED WITH ONE PHONE NUMBER

BACKGROUND

Users often have access to a number of communication devices for which they can receive calls from callers. In existing systems, an individual phone number must be allocated for each of the communication devices. In order to place a call to a particular communication device, a caller must dial the phone number associated with the communication device. Additionally, at a particular time and day a user may not have immediate access to a particular communication device when a caller places a call to that communication device.

SUMMARY

An embodiment of a method for routing an incoming call includes receiving, by a network routing device, an incoming call addressed to a single phone number associated with a plurality of users. The method further includes determining, by the network routing device, an incoming caller identifier associated with the incoming call, and determining, by the network routing device, whether the incoming caller identifier matches at least one caller identifier in a caller list associated with at least one particular user of the plurality of users. If the caller identifier matches a caller identifier in a caller list associated with the particular user, the incoming call is routed to at least one telephone associated with the particular user by the network routing device. In some embodiments, if the caller identifier does not match a caller identifier in a caller list associated with any of the plurality of users, a caller associated with the incoming call is prompted to choose an intended user of the plurality of users, and the incoming call is routed to at least one telephone associated with the intended user. In further embodiments, if the caller identifier matches at least one caller identifier in caller lists associated with multiple users of the plurality of users, a caller associated with the incoming call is prompted to choose at least one matching user of the plurality of users, and the incoming call is routed to at least one telephone associated with the at least one matching user.

An embodiment of a system for routing an incoming call includes a network routing device and a database in communication with the network routing device. The database includes a caller list having at least one caller identifier associated with at least one particular user of a plurality of users. The call router includes a processor(s) configured to receive an incoming call addressed to a single phone number associated with the plurality of users. The processor(s) is further configured to determine an incoming caller identifier associated with the incoming call, and determine whether the incoming caller identifier matches at least one caller identifier stored in the caller list associated with the at least one particular user. If the caller identifier matches a caller identifier in the caller list associated with the particular user, the processor(s) is configured to route the incoming call to at least one telephone associated with the particular user.

Another embodiment of a method for routing an incoming call includes receiving an incoming call addressed to a single phone number and determining an incoming caller identifier associated with the incoming call. The method further includes determining whether the incoming caller identifier matches at least one caller identifier in a caller list associated with at least one particular user of the plurality of users. If the caller identifier matches a caller identifier in a caller list associated with the particular user, the incoming call is routed to at least one communication device associated with the particular user based upon a unique hardware identifier associated with the at least one communication device. If the caller identifier does not match a caller identifier in a caller list associated with any of the plurality of users, the caller associated with the incoming call is prompted to choose an intended user of the plurality of users, and the incoming call is routed to at least one communication device associated with the intended user based upon the unique hardware identifier associated with the at least one communication device.

BRIEF DESCRIPTION OF THE DRAWINGS

Illustrative embodiments of the present invention are described in detail below with reference to the attached drawing figures, which are incorporated by reference herein and wherein:

FIG. 2 is an embodiment of the address book of FIG. 1 having a single phone number associated with a number of users;

DETAILED DESCRIPTION

Figure 1:
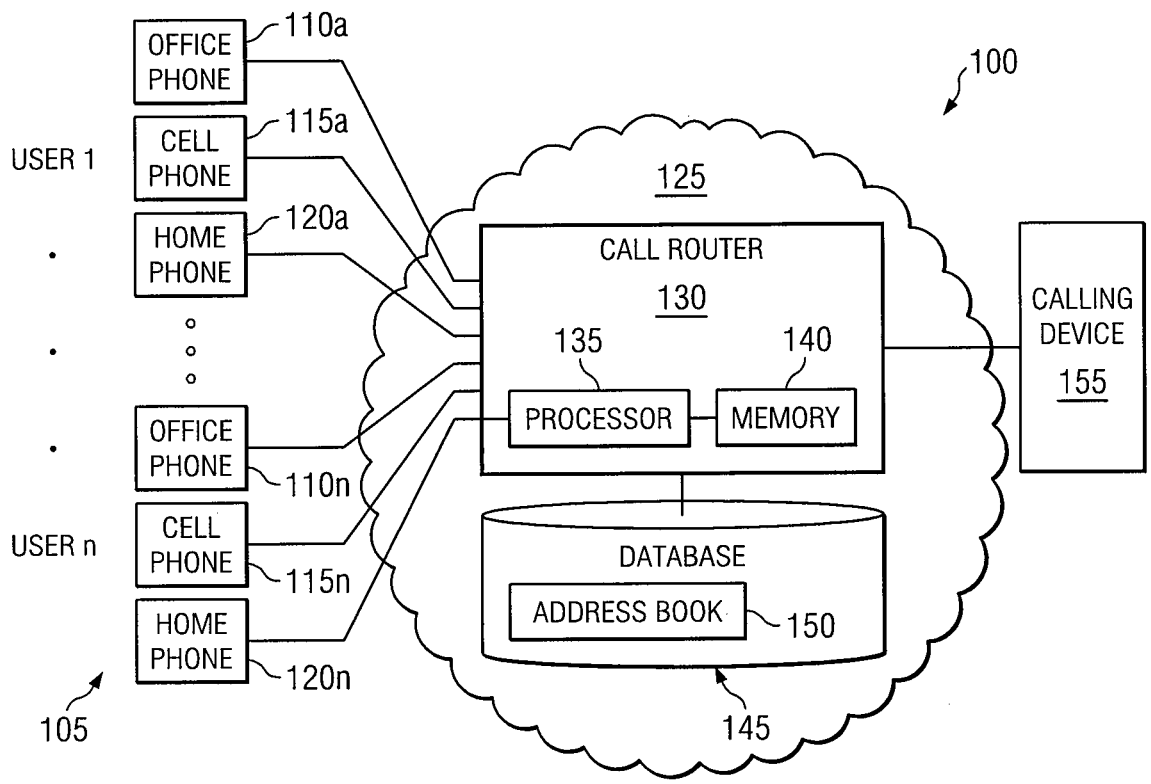
FIG. 1 is an embodiment of a system for routing an incoming call addressed to a single phone number to communication devices associated with more than one user.

FIG. 1 is an embodiment of a system 100 for routing an incoming call addressed to a single phone number to communication devices associated with more than one user. The system 100 includes a number of different user communication devices 105 associated with a number of users. In various embodiments, the user communication devices 105 may include telephones such as land-line phones, cell phones, PDAs, smartphones, personal computer (PC) based phones, voice over IP (VoIP) devices, and mobile handsets, or any telephonic communication device. A telephone refers to any device via which a user can conduct voice communication with another user over a communication network. In the embodiment illustrated in FIG. 1, the user communication devices 105 include an office phone 110a, a cell phone 115a, and a home phone 120a associated with a user #1. In at least one embodiment, the office phone 110a is a telephone located at user #1 workplace. The cell phone 115a is a mobile handset associated with user #1 and the home phone 120a is a telephone located at the user #1 home. In the particular embodiment illustrated in FIG. 1, the system 100 includes users 1-n with user "n" having an office phone 110n, a cell phone 115n, and a home phone 120n.

The user communication devices 105 are in communication with a call router 130, or other network routing device, located within a telecommunication network(s) 125. In various embodiments, each of the user communication devices 105 are able to operate independently of one another and may be located in different networks and/or associated with different service providers. The call router 130 includes a processor 135 and a memory 140. The memory 140 includes computer instructions configured to cause the processor 135 to perform the various functions of the call router 130 described herein. In the illustrated embodiment, the call router 130 is in communication with each of the user communication devices 105 via the telecommunication network(s) 125. In at least one embodiment, the network includes a PSTN and/or cell phone network. The call router 130 is in further communication with a database 145. The database 145 includes an address book 150 stored therein. In various embodiments, the address book 150 is a network address book located within telecommunication network(s) 125. In at least one embodiment, the address book 150 is provided and maintained by a service provider. In the illustrated embodiment, the address book 150 is associated with a single phone number. The address book 150 further stores information associated with a number of users of the user communication devices 105. In a particular embodiment, the address book 150 stores a user identifier associated with each user. For a particular user, the address book 150 stores a caller list. The caller list includes one or more caller identifiers associated with an incoming caller. In a particular embodiment, a caller identifier gives a phone number associated with an incoming caller. In still other embodiments, the caller identifier may be a name associated with an incoming caller. For each particular user, the address book further stores a device list associated with the user. The device list includes a device name and a unique hardware identifier associated with each user communication device 105 associated with the particular user. In a particular embodiment, the unique hardware identifier is established by a manufacturer of the user communication device 105. In at least one embodiment, the unique hardware identifier is a media access control (MAC) address. In still other embodiments, the unique hardware identifier may be an electronic serial number associated with the user communication device. In at least one embodiment, the call router 130 is configured to route an incoming call to one or more of the user communication devices 105 according to the information contained in the address book 150. In various embodiments, the address book 150 is configured to store caller lists and device lists associated with a plurality of users, each associated with the same phone number.

In the described embodiment, an incoming call may be placed to any of the user communication devices 105 associated with the address book 150 by the caller dialing the single phone number. Each of the user communication devices 105 are not required to have an allocated phone number. Instead, each of the user communications devices 105 are identified using the unique hardware identifier. Incoming calls are routed to one or more of the user communication devices 105 using the unique hardware identifier.

The system 100 illustrated in FIG. 1 further includes a calling device 155. The calling device 155 is configured to allow a caller to place an incoming call to one or more of the user communication devices 105. In at least one embodiment, the call router 130 routes an incoming call addressed to the single phone number to one or more of the user communication devices 105 in accordance with the user information stored in the address book 150. In some embodiments, the address book 150 further stores a call routing policy for each user. The call routing policy may include time-of-day routing information, as well as other information related to routing features, such as call forwarding, call rejection, simultaneous message delivery to multiple communication devices 105, and sequential delivery of messages to one or more user communication devices 105. The time-of-day routing information may include information indicating the user's expected location at a particular time of day and/or a particular day of the week and/or date, such as shown in Table I.

TABLE I

| User | Device | Time-of-Day Routing Information |
| --- | --- | --- |
| John Smith | work phone | 09:00-17:00 |
|  | study phone | 1700-2000 |
|  | bedroom phone | 20:00-09:00 |

Examples of time-of-day routing information include public holidays, scheduled vacations, working hours, nonworking hours, and other user location information. Examples of user location information include whether the user is at home, work, away from the office, or working remotely. In at least one embodiment, a user or users associated with the address book 150 may configure and/or modify the information contained in the address book 150 using a web portal located on the internet or a company intranet.

FIG. 2 is an embodiment of the address book 150 of FIG. 1 having a single phone number associated with a number of users. A phone number "913-555-1234" is associated with the address book 150. In the particular embodiment of FIG. 2, three users are associated with the address book 150. In this particular example, the three users are all members of a single family. User #1 is John Smith, the father of the family. User #2 is Susan Smith, the mother of the family. User #3 is Jane Smith, the daughter of the family. Each of user #1, user #2, and user #3 has an associated caller list stored in the address book 150 in the illustrated embodiment. Each caller list includes one or more caller identifiers. The caller identifiers identify an incoming caller using the calling device 155 or other calling devices. In the embodiment illustrated of FIG. 2, the caller identifiers are phone numbers, each of the phone numbers identifying a different incoming caller. The address book further includes a device list associated with each of user #1, user #2, and user #3. Each device list includes a list of device names and associated unique hardware identifiers. The device name provides for a short description of the identified user communication device 105. In some embodiments, the device name and unique hardware identifier may be limited to be entered or modified by a particular user associated with the user communication device 105 or a supervisory user associated with the address book 150. Entering and modifying the address book 150 may be performed by a user via a network, such as interacting with a website on the Internet. In at least one embodiment, caller identifiers of the address book 150 may be automatically populated from already existing contact information in one or more user communication devices 105, such as a cell phone. The unique hardware identifier uniquely identifies each user communication device 105 associated with each of user #1, user #2, and user #3. In the embodiment illustrated in FIG. 2, the unique hardware identifier associated with each communication device is a MAC address. In at least one embodiment, the unique hardware identifier may be automatically obtained from the user communication devices 105, such as by a polling procedure. In the illustrated embodiment, each of user #1, user #2, and user #3 has a work phone, a home phone, and a cell phone in their respective device lists. In still other embodiments, each user may have additional communication devices, such as a PDA or personal computer, each having a unique hardware identifier, stored in their respective device lists.

In an example operation of the embodiment of the address book 150 of FIG. 2, a caller using calling device 155 places an incoming call addressed to phone number "913-555-1234". In this example, the incoming call includes a caller identifier "214-556-7654" obtained from caller ID information. In the present example, the call router 130 receives the incoming call addressed to phone number "913-555-1234", and accesses the address book 150 associated with that phone number. The call router 130 then matches the caller identifier associated with the incoming call to caller identifiers contained in the caller lists of user #1, user #2, and user #3. In this particular example, the caller identifier 214-556-7654 is located in the caller list of user #1, John Smith. The call router 130 then routes the incoming call to one of the user communication devices 105 contained in the device list associated with user #1. In this example, the call router 130 routes the incoming call to each of the work phone, home phone, and cell phones associated with John Smith in accordance with preferences set by John Smith. In still other embodiments, the call router 130 may route the incoming call to one or more of the work phones, home phones, and cell phones associated with John Smith according to preferences set by John Smith.

In another example operation of the embodiment of FIG. 2, an incoming call having a caller identifier of "214-555-1289" places a call addressed to phone number "913-555-2134". The call router 130 then matches the caller identifier to the entries in the caller lists of each of user #1, user #2, and user #3. In this particular example, the caller identifier "214-555-1289" matches an entry in each of the call lists of user #1 and user #2. The call router 130 then prompts the caller regarding whether he wishes to route the incoming call to John Smith or Susan Smith. In at least one embodiment, the prompting of the caller is done via a voice prompt having a content, for example, of "Do you wish to route the call to John Smith, Susan Smith, or both." In one embodiment, the caller chooses the intended user by speaking "John", "Susan", or both. In still other embodiments, the caller may chose the intended user by pressing a key on a handset of the calling device 155. Upon the caller choosing the user to which he wishes his incoming call to be routed, the call router 130 routes the incoming call to a communication device 105 associated with the chosen user.

Figure 3:
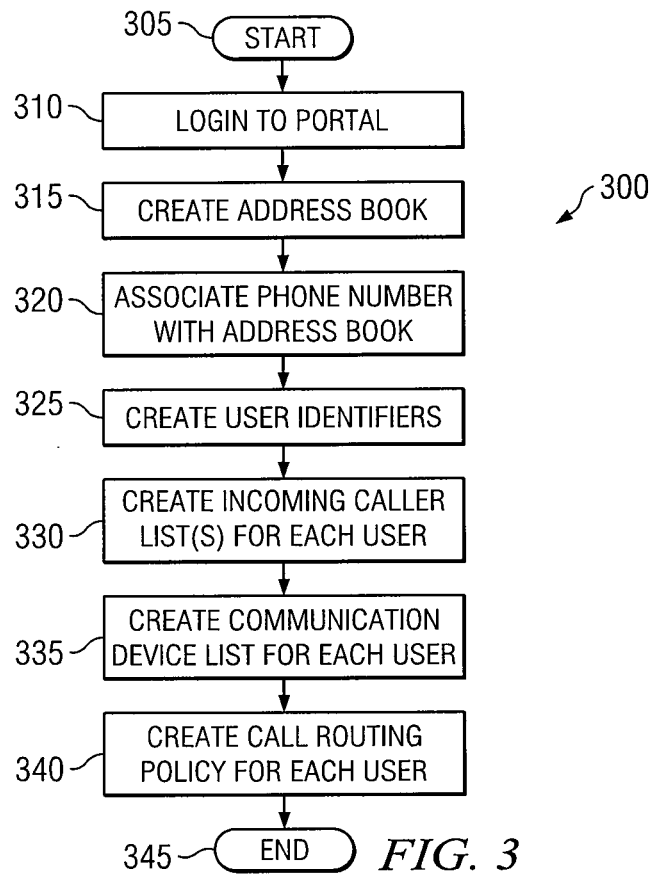
FIG. 3 is an embodiment of a procedure for configuring an address book for routing incoming calls to one or more users associated with a single phone number.

FIG. 3 is an embodiment of a procedure 300 for configuring an address book 150 for routing incoming calls to one or more users associated with a single phone number. The procedure 300 begins in step 305. In step 310, a supervisory user logs in to a portal by entering a user ID and/or password. In at least one embodiment, the portal is a web portal. In step 315, the supervisory user creates an address book. In step 320, a phone number is associated with the address book. In step 325, user identifiers are created for each user associated with the address book 150. In step 330, one or more incoming caller lists are created for each user. The incoming caller lists include caller identifiers associated with incoming callers. In a particular embodiment, the caller identifiers include one or more phone numbers associated with an incoming caller. In a particular embodiment, each user may have one caller list. In still other embodiments, each user may have multiple caller lists, each having their own list of caller identifiers. For example, a particular user may wish to have a personal VIP list, a work list, a work VIP list, and a home list.

In step 335, a communication device list is created for each user. The communication device list includes a device name, and a unique hardware identifier associated with each device. The device name and/or the unique hardware identifier may be entered by either a user or a service provider. In at least one embodiment, the unique hardware identifier is a hardware identifier established by a manufacturer of the user communication device 105. In a particular embodiment, the unique hardware identifier is a MAC address. In step 340, a call routing policy may be created for each user. The call routing policy specifies the manner in which calls from a particular incoming caller are to be routed to the user communication devices 105 associated with the particular user. For example, the call routing policy may specify to which of the user communication devices 105 a call from a particular caller is to be routed. Further, the call routing policy may contain user location information, such as time-of-day information. In a particular embodiment, the address book, the user identifiers, the incoming caller list, the communication device list, and call routing policies for each user are stored in the database 145. In step 345, the procedure 300 ends.

In various embodiments the supervisory user may log in to the portal to change and/or modify entries in the address book 150 associated with each user using a supervisory login id and/or password. In further embodiments, each of the users may log in to the portal and change and/or modify entries in the address book 150 associated with that particular user, such as that user's caller list or device list, using a user login id and/or password. Although shown as a supervisory user, it should be understood that each user may be given access t add an modify their personal address book.

Figure 4:
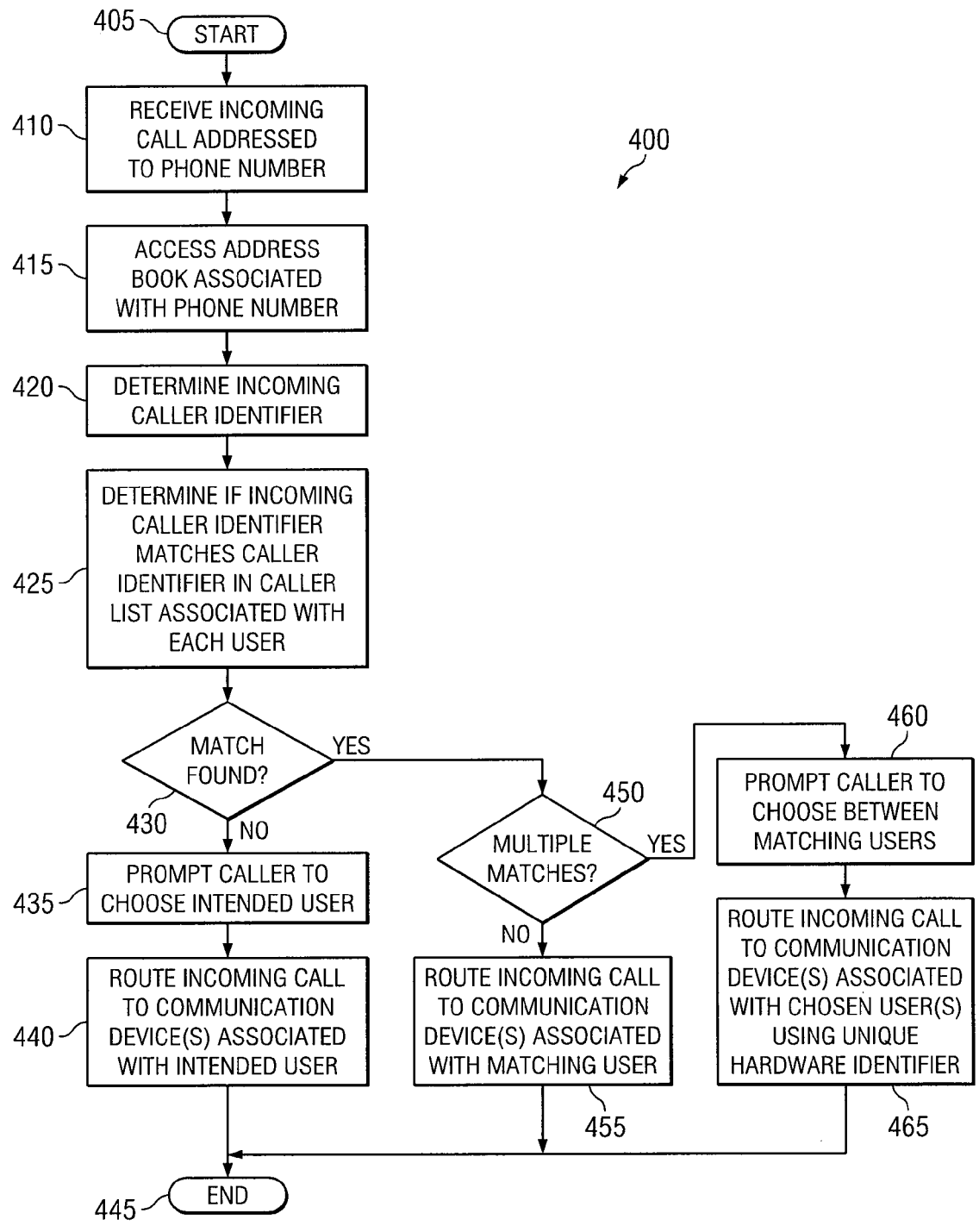
FIG. 4 is an embodiment of a procedure for routing an incoming call addressed to a single phone number to communication devices associated with more than one user.

FIG. 4 is an embodiment of a procedure 400 for routing an incoming call addressed to a single phone number to communication devices associated with more than one user. The procedure 400 begins in step 405. In step 410, an incoming call addressed to a phone number is received by the call router 130. In step 415, the call router 130 accesses an address book associated with the phone number from the database 145. The address book includes a number of user identifiers, each associated with a different users. The address book further includes one or more caller lists and a device list associated with each user. In step 420, the call router 130 determines an incoming caller identifier associated with the incoming call. In at least one embodiment, the incoming caller identifier is a phone number. In some embodiments, the phone number is obtained from caller ID information associated with the incoming call.

In step 425, the call router 130 determines if the incoming caller identifier matches a caller identifier in a caller list associated with each user. In step 430, the call router 130 determines if a match is found. If a match is not found in step 430, the procedure continues to step 435. In step 435, the call router 130 prompts the caller to choose an intended user to which he wishes the incoming call to be routed. In step 440, the call router 130 routes the incoming call to one or more communication devices 105 associated with the intended user. In at least one embodiment, the determination regarding which user communication devices 105, to which the incoming call is to be routed, is determined according to the user's call routing policy. In some embodiments, if a call routing policy is not available, the caller may be prompted by the call router 130 to choose the user communication device 105 to which the call is to be routed, for example, a home phone, an office phone, or a cell phone. Alternatively, the call may be routed to a default communication device, such as a mobile telephone. In a particular embodiment, the call router 130 routes the incoming call to the particular user communication device or devices 105 associated with the user using the unique hardware identifier found in the device list. In an alternative embodiment, the caller may be prompted to provide a caller identification, such as by the caller speaking his name or entering an identification number associated with the caller, if a match is not found in the network address book. If the caller's name or identification number is found in the network address book 150, the caller will then be prompted to choose the intended user. After the caller chooses the intended user, the incoming call may be routed to the intended user based upon the routing policy. In step 445, the procedure 400 ends. In at least one embodiment, the procedure 400 ends if the caller does not respond to the prompt in a predetermined time period.

If in step 430 the call router 130 matches the incoming caller identifier to a caller identifier in a caller list associated with a user, the procedure continues in step 450. In step 450, the call router 130 determines whether the incoming caller identifier matches a caller identifier in caller lists associated with multiple users. If in step 450, the call router 130 determines that the incoming caller identifier does not match caller identifiers in caller lists associated with multiple users the procedure continues to step 455. Such a situation occurs when the incoming caller identifier matches a caller identifier in a list associated with only one user. In step 455, the call router 130 routes the incoming call to one or more user communication devices 105 associated with the matching user. The procedure 400 then continues to step 445 in which the procedure 400 ends.

If in step 450 it is determined that the incoming caller identifier matches caller identifiers in caller lists associated with multiple users, the procedure continues in step 460. In step 460, the caller is prompted to choose to which of the matching users the call is to be routed. In a particular embodiment, the caller may designate more than one chosen user. After the caller chooses the user to which he wishes the incoming call to be directed, the call router 130 routes the incoming call to the user communication devices 105 associated with the chosen user or chosen users using the unique hardware identifier. The procedure 400 then continues to step 445 in which the procedure ends.

In at least one embodiment, one or more users associated with the network address book 150 may view a list of caller identifiers for which no match was found in the network address book 150, and choose to add one or more of the unmatched caller identifiers to the network address book 150. In at least one embodiment, a user may use one or more of the user communication devices 105 to view the unmatched caller identifiers, and select one or more of the unmatched caller identifiers to be added to the portion of network address book 150 associated with the user. In still other embodiments, a user may log in to a portal to view the list of unmatched caller identifiers, and select one or more unmatched caller identifiers to be added to the network address book 150 associated with the user.

Figure 5:
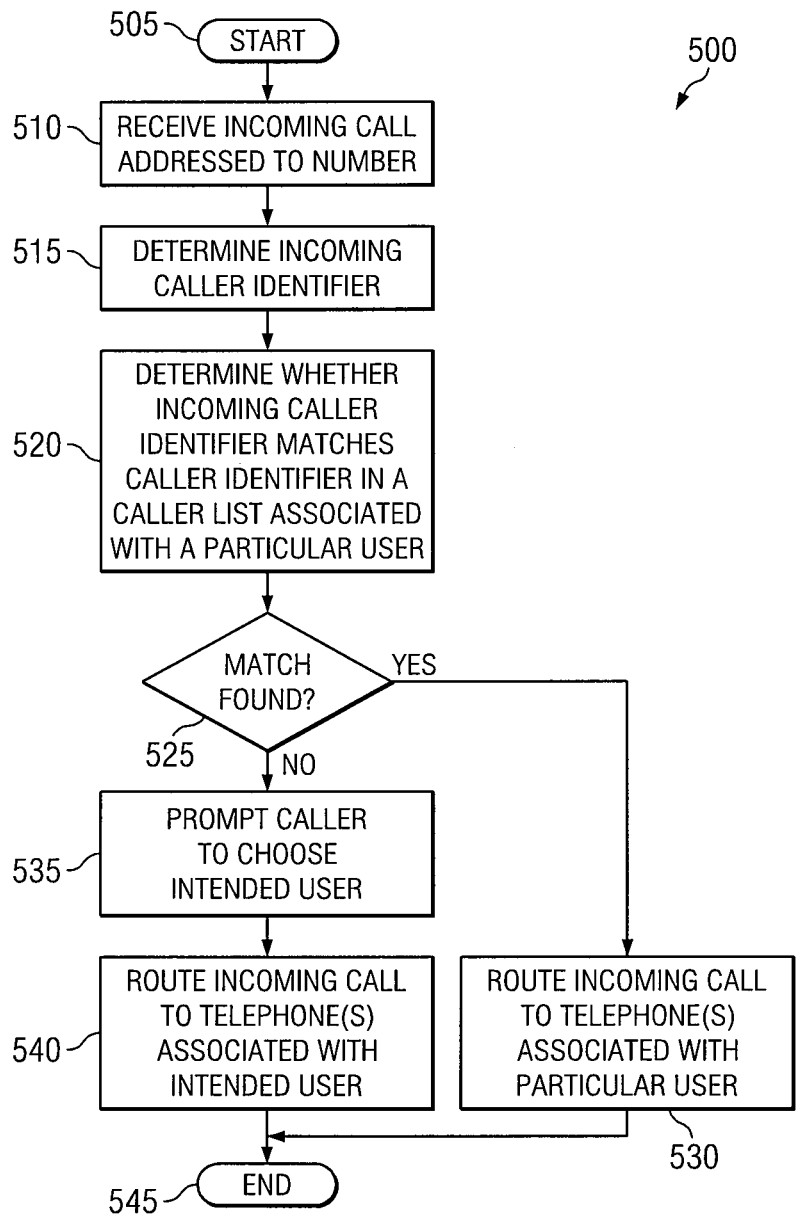
FIG. 5 is another embodiment of a procedure for routing an incoming call addressed to a single phone number to communication devices associated with more than one user.

FIG. 5 is another embodiment of a procedure 500 for routing an incoming call addressed to a single phone number to communication devices associated with more than one user. In step 505, the procedure begins. In step 510, an incoming call addressed to a single phone number is received at a network routing device. The single phone number associated with a plurality of users. In step 515, the network routing device determines an incoming caller identifier associated with the incoming call. In step 520, the network routing device determines whether the incoming caller identifier matches at least one caller identifier in a caller list associated with at least one particular user of the plurality of users. If it is determined in a step 525 that the caller identifier matches a caller identifier in the caller list associated with the particular user, the incoming call is routed by the network routing device to at least one telephone associated with the particular user in a step 530. If it is determined in a step 525 that the caller identifier does not match a caller identifier in a caller list associated with any of the plurality of users, a caller associated with the incoming call is prompted to choose an intended user of the plurality of users in step 535, and the incoming call is routed to at least one telephone associated with the intended user in step 540. In step 545, the procedure 500 ends.

Figure 6:
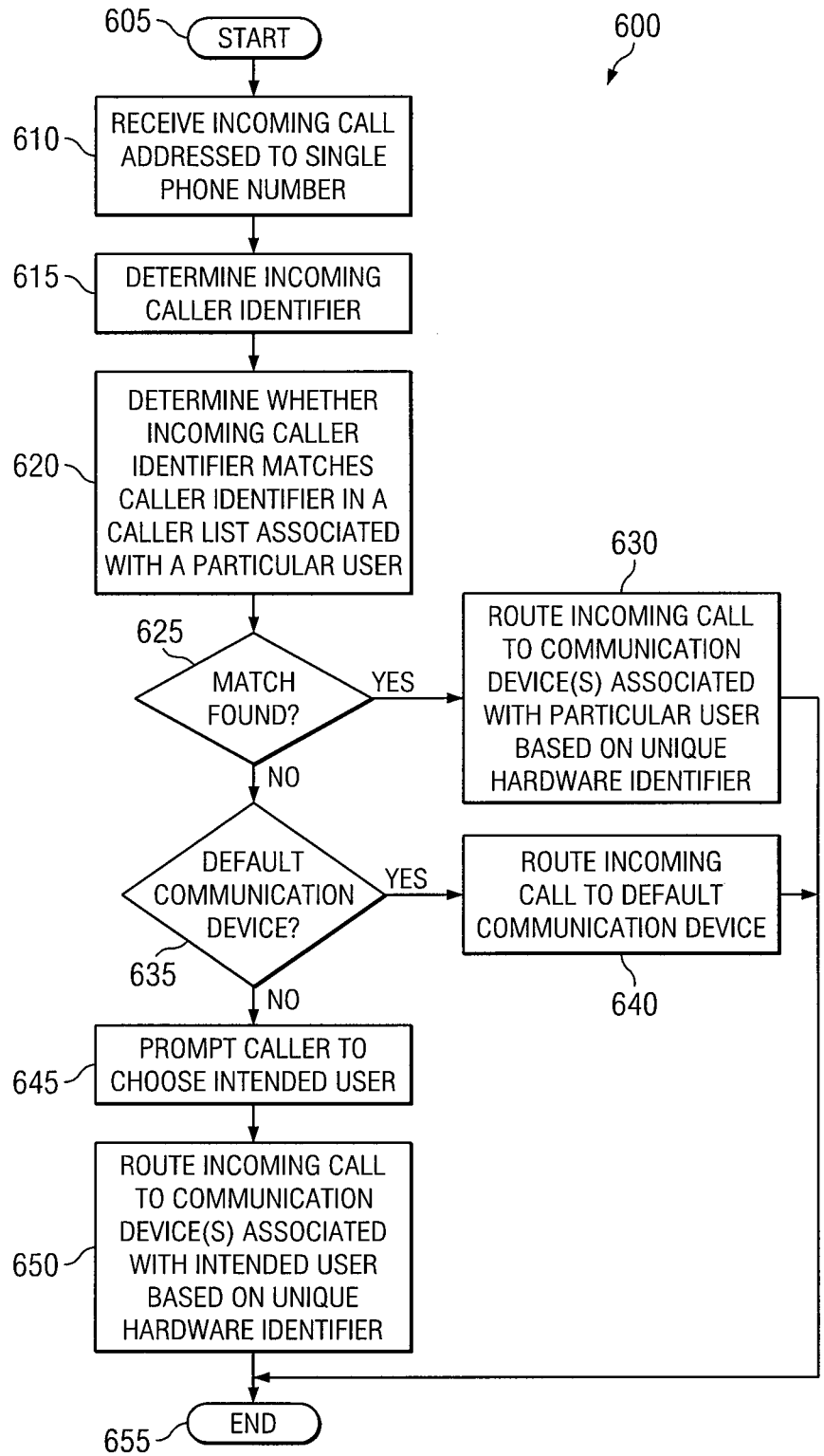
FIG. 6 is another embodiment of a procedure for routing and incoming call addressed to a single phone number to communication devices associated with more than one user.

FIG. 6 is another embodiment of a procedure 600 for routing and incoming call addressed to a single phone number to communication devices associated with more than one user. The procedure 600 begins in step 605. In step 610, an incoming call addressed to a single phone number is received at a network routing device. In step 615, an incoming caller identifier associated with the incoming call is determined. In step 620, whether the incoming caller identifier matches at least one caller identifier in a caller list associated with at least one particular user of the plurality of users is determined. If in step 625 it is determined that the caller identifier matches a caller identifier in a caller list associated with the particular user, the incoming call is routed to at least one communication device associated with the particular user based upon a unique hardware identifier associated with the at least one communication device in step 630. If in step 625 it is determined that the caller identifier does not match a caller identifier in a caller list associated with any of the plurality of users, in step 635 it is determined whether a default communication device has been established to receive unmatched calls; and if so, the incoming call is routed to the default communication device in step 640. In at least one embodiment, the default communication device may be established by a user of the address book 150.

If no default communication device has been established, a caller associated with the incoming call is prompted to choose an intended user of the plurality of users in step 645, and the incoming call is routed to at least one communication device associated with the intended user based upon the unique hardware identifier associated with the at least one communication device in step 650. Alternately, in addition to selecting a user, the caller may be prompted to select a communication device associated with the user to which to route the call based on the user communication devices 105 in the address book of the user. In step 655, the procedure 600 ends.

The illustrative embodiments can take the form of an entirely hardware embodiment, an entirely software embodiment, or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device. In various embodiments, the call router 130 includes one or more processors operable to execute computer executable instructions from a computer-usable or computer-readable medium to perform the various capabilities of the call router 130 described herein.

The computer-usable or computer-readable medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Further, a computer storage medium may contain or store a computer-readable program code, such that when the computer-readable program code is executed on a computer, the execution of this computer-readable program code causes the computer to transmit another computer-readable program code over a communication link. This communication link may use a medium that is, for example, without limitation, physical, or wireless.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for routing an incoming call comprising:
    receiving, at a network routing device, an incoming call addressed to a single phone number, the single phone number associated with a plurality of users;
    determining, by the network routing device, an incoming caller identifier associated with the incoming call;
    determining, by the network routing device, whether the incoming caller identifier matches at least one caller identifier in a caller list associated with at least one user of the plurality of users, wherein the network routing device is configured to enable each of the plurality of users to create multiple caller lists, wherein the network routing device is configured to further enable a different routing policy to be assigned to each of the multiple caller lists of a user;
    if the incoming caller identifier matches a caller identifier in the caller list associated with at least one user of the plurality of users:
        routing, by the network routing device, the incoming call to at least one telephone associated with the at least one user of the plurality of users based upon a call routing policy associated with the caller list, wherein the call routing policy includes a time-of-day routing policy for the at least one user;
    if the incoming caller identifier does not match a caller identifier in a caller list associated with any of the plurality of users:
        prompting a caller associated with the incoming call to choose an intended user of the plurality of users; and
        routing the incoming call to at least one telephone associated with the intended user; and
    if the incoming caller identifier matches at least one caller identifier in multiple caller lists associated with multiple users of the plurality of users:
        prompting a caller associated with the incoming call to choose at least one matching user of the multiple users; and
        routing the incoming call to at least one telephone associated with the at least one matching user.

2. The method of claim 1 further comprising:
    wherein routing the incoming call to the at least one telephone associated with the at least one user of the plurality of users includes routing the incoming call to the telephone based upon a unique hardware identifier associated with the at least one telephone.

3. The method of claim 1, wherein the call routing policy designates an order for sequential routing of the incoming call to a list of communication devices associated with the at least one user.

4. The method of claim 1, wherein the call routing policy designates simultaneous delivery of the incoming call to all communication devices associated with the at least one user.

5. The method of claim 1 further comprising:
    creating an address book;
    associating the address book with the single phone number;
    storing a plurality of user identifiers in the address book, each user identifier associated with a user;
    storing at least one caller list associated with each user in the address book, the caller list including at least one caller identifier associated with an incoming caller; and
    automatically populating the at least one caller list of the user from existing contact information stored on one or more communication devices of the user.

6. The method of claim 5 further comprising:
    storing a device list associated with each user in the address book, the device list including at least one unique hardware identifier associated with a telephone.

7. A system for routing an incoming call comprising:
    a call router; and
    a database in communication with the call router, the database including a caller list having at least one caller identifier associated with at least one user of a plurality of users;
    the call router including at least one processor configured to:
        automatically populate the database from existing contact information stored on one or more communication devices associated with the plurality of users, wherein the existing contact information is used to automatically generate at least one caller list for each of the plurality of users;
        assign one of a plurality of routing policies to each of a plurality of caller lists for each of the plurality of users;
        receive an incoming call addressed to a single phone number, the single phone number associated with the plurality of users;
        determine an incoming caller identifier associated with the incoming call;
        determine whether the incoming caller identifier matches at least one caller identifier stored in the caller list associated with the at least one user;
        if the incoming caller identifier matches a caller identifier in the caller list associated with the at least one user:
            route the incoming call to at least one telephone associated with the at least one user based upon a call routing policy associated with the at least one user, wherein the call routing policy includes a time-of-day routing policy for the at least one user;
        if the incoming caller identifier does not match a caller identifier in a caller list associated with any of the plurality of users:
            prompt a caller associated with the incoming call to choose an intended user of the plurality of users; and
            route the incoming call to at least one telephone associated with the intended user; and
        if the incoming caller identifier matches at least one caller identifier in multiple caller lists associated with multiple users of the plurality of users:
            prompt a caller associated with the incoming call to choose at least one matching user of the multiple users; and route the incoming call to at least one telephone associated with the at least one matching user.

8. The system of claim 7, wherein routing the incoming call to the at least one telephone associated with the at least one user includes routing the incoming call to the at least one telephone based upon a unique hardware identifier associated with the at least one telephone.

9. The system of claim 8, wherein the unique hardware identifier is established by a manufacturer of the at least one telephone.

10. The system of claim 7, wherein the at least one processor is further configured to:
   route the incoming call to a particular telephone associated with the at least one user based upon a call routing policy associated with the at least one user.

11. The system of claim 7, wherein the at least one processor is further configured to:
   create an address book in the database;
   associate the address book with the single phone number;
   store a plurality of user identifiers in the address book, each user identifier associated with a user;
   store at least one caller list associated with each user in the address book, the caller list including at least one caller identifier associated with an incoming caller.

12. The system of claim 11, wherein the at least one processor is further configured to:
   store a device list associated with each user in the address book, the device list including at least one unique hardware identifier associated with a telephone.

\* \* \* \* \*